(12) United States Patent
Nakamura

(10) Patent No.: US 12,436,230 B2
(45) Date of Patent: Oct. 7, 2025

(54) RADAR DEVICE

(71) Applicants: DENSO CORPORATION, Kariya (JP); MIRISE Technologies Corporation, Nisshin (JP)

(72) Inventor: Takuya Nakamura, Nisshin (JP)

(73) Assignees: DENSO CORPORATION, Kariya (JP); MIRISE Technologies Corporation, Nisshin (JP)

( * ) Notice: Subject to any disclaimer, the term of this patent is extended or adjusted under 35 U.S.C. 154(b) by 426 days.

(21) Appl. No.: 18/173,217

(22) Filed: Feb. 23, 2023

(65) Prior Publication Data

US 2023/0350007 A1 Nov. 2, 2023

(30) Foreign Application Priority Data

May 2, 2022 (JP) ................. 2022-076055

(51) Int. Cl.
*G01S 7/02* (2006.01)
*G01S 7/35* (2006.01)
*G01S 13/931* (2020.01)

(52) U.S. Cl.
CPC .............. *G01S 7/023* (2013.01); *G01S 7/354* (2013.01); *G01S 13/931* (2013.01)

(58) Field of Classification Search
CPC ......... G01S 13/931; G01S 7/023; G01S 7/354
USPC .......................................... 342/175, 192, 70
See application file for complete search history.

(56) References Cited

U.S. PATENT DOCUMENTS

| | | | | |
|---|---|---|---|---|
| 5,271,038 A | * | 12/1993 | Cai | H04B 1/1027 327/309 |
| 5,448,244 A | * | 9/1995 | Komatsu | G01S 13/345 342/155 |
| 5,539,412 A | * | 7/1996 | Mendelson | G01R 23/16 324/76.19 |
| 5,960,391 A | * | 9/1999 | Tateishi | G10L 21/0272 704/232 |
| 6,212,942 B1 | * | 4/2001 | Hara | G01M 3/24 73/40.5 A |
| 6,351,731 B1 | * | 2/2002 | Anderson | G10L 21/0208 704/226 |
| 6,469,662 B2 | * | 10/2002 | Tullsson | G01S 7/0232 342/159 |
| 6,807,405 B1 | * | 10/2004 | Jagger | H04B 1/7103 455/278.1 |

(Continued)

Primary Examiner — Michael W Justice
(74) Attorney, Agent, or Firm — Posz Law Group, PLC

(57) ABSTRACT

An interference signal processing unit of a radar device is configured to: determine an interference range in a sample signal; generate a modified sample signal by multiplying the sample signal by a reduction signal; convert the modified sample signal into a first frequency domain sample signal in a frequency domain; convert the reduction signal into a subtraction template signal in a frequency domain; calculate an evaluation value based on the first frequency domain sample signal and the subtraction template signal so as to determine whether a partial signal of the first frequency domain sample signal is derived from a reflected wave from an object; and generate an interference-removed signal so that a time domain signal based on the partial signal determined as derived from the reflected wave based on the evaluation value is included in the corresponding range of the interference-removed signal.

9 Claims, 11 Drawing Sheets

(56) References Cited

U.S. PATENT DOCUMENTS

| | | | |
|---|---|---|---|
| 7,403,153 B2* | 7/2008 | Kelly, Jr. | G01S 7/023 342/16 |
| 7,460,058 B2* | 12/2008 | Nakanishi | G01S 7/36 342/28 |
| 7,911,985 B2* | 3/2011 | Proctor, Jr. | H04B 7/15571 370/293 |
| 8,116,239 B2* | 2/2012 | Proctor, Jr. | H04B 7/15542 370/293 |
| 8,619,837 B2* | 12/2013 | Proctor, Jr. | H04B 7/15571 370/328 |
| 8,928,523 B2* | 1/2015 | Lee | G01S 13/345 342/159 |
| 9,110,152 B2* | 8/2015 | Ando | G01S 7/4056 |
| 9,363,024 B2* | 6/2016 | Nguyen | G01S 13/0209 |
| 9,689,967 B1* | 6/2017 | Stark | G01S 7/0233 |
| 9,791,551 B1* | 10/2017 | Eshraghi | G01S 7/038 |
| 9,945,943 B2* | 4/2018 | Stark | G01S 7/0233 |
| 9,952,312 B2* | 4/2018 | Corbett | G01S 7/023 |
| 10,116,407 B2* | 10/2018 | Pande | H04L 27/2647 |
| 10,215,853 B2* | 2/2019 | Stark | H04B 17/345 |
| 10,330,773 B2* | 6/2019 | Rao | G01S 13/584 |
| 10,591,582 B1* | 3/2020 | Musgrove | G01S 13/90 |
| 11,520,031 B2* | 12/2022 | Chi | G01S 7/415 |
| 11,693,085 B2* | 7/2023 | Meissner | G01S 7/023 342/21 |
| 11,940,551 B2* | 3/2024 | Chi | G01S 13/58 |
| 2002/0027522 A1* | 3/2002 | Tullsson | G01S 7/36 342/132 |
| 2004/0062317 A1* | 4/2004 | Uesugi | H04L 27/2647 375/E1.02 |
| 2008/0094274 A1* | 4/2008 | Nakanishi | G01S 7/023 342/91 |
| 2008/0225758 A1* | 9/2008 | Proctor | H04B 7/15542 370/279 |
| 2008/0225930 A1* | 9/2008 | Proctor | H04B 7/15542 455/24 |
| 2008/0225931 A1* | 9/2008 | Proctor | H04B 7/15585 455/24 |
| 2012/0112955 A1* | 5/2012 | Ando | G01S 13/931 342/159 |
| 2012/0176266 A1* | 7/2012 | Lee | G01S 7/0235 342/27 |
| 2017/0293027 A1* | 10/2017 | Stark | G01S 13/87 |
| 2017/0307729 A1* | 10/2017 | Eshraghi | G01S 7/038 |
| 2017/0363711 A1* | 12/2017 | Rao | G01S 7/023 |
| 2018/0231655 A1* | 8/2018 | Stark | H04B 17/309 |
| 2019/0331765 A1* | 10/2019 | Rao | G01S 13/34 |
| 2020/0003864 A1* | 1/2020 | Chi | G01S 13/52 |
| 2020/0124699 A1* | 4/2020 | Meissner | G01S 13/0209 |
| 2022/0120844 A1* | 4/2022 | Bechter | G01S 7/354 |
| 2022/0179040 A1* | 6/2022 | Chi | G01S 7/282 |
| 2024/0319323 A1* | 9/2024 | Shalita | G01S 13/89 |

* cited by examiner

RADAR DEVICE

CROSS REFERENCE TO RELATED APPLICATION

This application is based on Japanese Patent Application No. 2022-076055 filed on May 2, 2022, the disclosure of which is incorporated herein by reference.

TECHNICAL FIELD

The present disclosure relates to a radar device.

BACKGROUND

A radar device measures an object based on a beat signal obtained by mixing a transmitted signal sent as electromagnetic wave to the object and a received signal of electromagnetic wave reflected by the object.

SUMMARY

According to one aspect of the present disclosure, a radar device includes: a transmitter configured to emit a transmission signal as an electromagnetic wave; a receiver configured to receive, as a reception signal, a reflected wave representing the electromagnetic wave reflected by an object; a beat signal generator configured to generate a beat signal based on the transmission signal and the reception signal; a sample signal generator configured to generate a sample signal, which is a digital signal in a time domain or a time frequency domain, based on the beat signal; and an interference signal processing unit configured to generate an interference-removed signal obtained by removing an interference component from the sample signal. The interference signal processing unit includes: an interference range determination unit configured to determine an interference range representing a range in which the interference component is included in the sample signal; a modified sample signal generator configured to generate a modified sample signal by multiplying the sample signal by a reduction signal for reducing a signal intensity in the interference range; a sample signal conversion unit configured to convert the modified sample signal into a first frequency domain sample signal in a frequency domain; a reduction signal conversion unit configured to convert the reduction signal into a subtraction template signal in a frequency domain; and an evaluation value calculator configured to calculate an evaluation value based on the first frequency domain sample signal and the subtraction template signal so as to determine whether a partial signal representing at least a part of the first frequency domain sample signal is derived from the reflected wave. The interference signal processing unit generates the interference-removed signal such that a time domain signal based on the partial signal determined to be derived from the reflected wave based on the evaluation value is included in a corresponding range corresponding to the interference range of the interference-removed signal.

DETAILED DESCRIPTION

Figure 1:
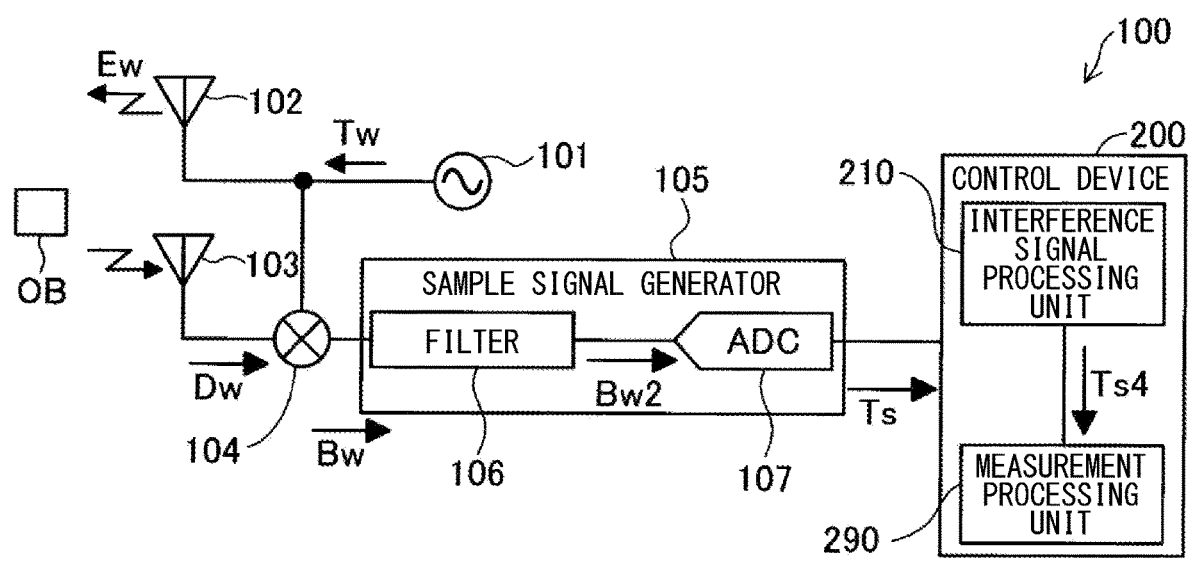
FIG. 1 is an explanatory diagram showing a schematic configuration of a radar device according to a first embodiment.

A radar device measures an object based on a beat signal obtained by mixing a transmitted signal sent as electromagnetic wave to the object and a received signal of electromagnetic wave reflected by the object. An interference component may occur in the beat signal due to interference with transmission signals from the other radar devices. A technology to remove such interference components sets the amplitude to zero in the interference range containing the interference component, and interpolates the interference range based on true partial signals derived from electromagnetic waves reflected by the object. The true partial signal may be determined based on the intensity of the partial signal.

However, in case where the true partial signal is determined based solely on the intensity, the partial signal can be erroneously determined (so-called sidelobes) by setting the amplitude as zero in the interference range. In this case, the interference range cannot be interpolated appropriately, and there is a possibility that the accuracy of measuring the target object by the radar device may be lowered.

The present disclosure may be provided by the following.

According to one aspect of the present disclosure, a radar device includes: a transmitter configured to emit a transmission signal as an electromagnetic wave; a receiver configured to receive, as a reception signal, a reflected wave representing the electromagnetic wave reflected by an object; a beat signal generator configured to generate a beat signal based on the transmission signal and the reception signal; a sample signal generator configured to generate a sample signal, which is a digital signal in a time domain or a time frequency domain, based on the beat signal; and an interference signal processing unit configured to generate an interference-removed signal obtained by removing an interference component from the sample signal. The interference signal processing unit includes: an interference range determination unit configured to determine an interference range representing a range in which the interference component is included in the sample signal; a modified sample signal generator configured to generate a modified sample signal by multiplying the sample signal by a reduction signal for reducing a signal intensity in the interference range; a sample signal conversion unit configured to convert the modified sample signal into a first frequency domain sample signal in a frequency domain; a reduction signal conversion unit configured to convert the reduction signal into a subtraction template signal in a frequency domain; and an evaluation value calculator configured to calculate an evaluation value based on the first frequency domain sample signal and the subtraction template signal so as to determine whether a partial signal representing at least a part of the first frequency domain sample signal is derived from the reflected wave. The interference signal processing unit generates the interference-removed signal such that a time domain signal based on the partial signal determined to be derived from the reflected wave based on the evaluation value is included in a corresponding range corresponding to the interference range of the interference-removed signal.

Accordingly, it is possible to determine whether or not the partial signal is a true partial signal derived from the reflected wave based on the evaluation value calculated based on the first frequency domain sample signal and the subtraction template signal. This reduces the erroneous determination that sidelobes contained in the first frequency domain sample signal are erroneously determined as true partial signals. Further, the object can be measured with high accuracy by measuring the object based on the interference-removed signal, compared with a case, for example, where an object is measured based on a signal interpolated by partial signals estimated to be the true partial signal simply based on the intensity.

A. First Embodiment

A radar device 100 shown in FIG. 1 is mounted on a vehicle such as an automobile or a two-wheeled vehicle, and measures an object OB such as pedestrian, other vehicles, and obstacle on the road. Specifically, the radar device 100 measures the distance and angle between the subject vehicle on which the radar device 100 is mounted and the object OB, and/or measures the relative speed of the object OB with respect to the subject vehicle. The radar device 100 in this embodiment is configured as a millimeter wave radar that measures the object OB by Fast-Chirp Modulation (FCM) method. In another embodiment, the radar device 100 may be configured as a radar that measures the object OB by frequency modulated continuous wave (FMCW) method.

As shown in FIG. 1, the radar device 100 includes a signal generator 101, a transmitter 102, a receiver 103, a beat signal generator 104, a sample signal generator 105 and a control device 200.

The signal generator 101 includes, for example, a voltage-control oscillator, and generates a transmission signal Tw. The signal generator 101 in the present embodiment continuously generates a chirp signal consisting of a steep up-chirp with a very high frequency increase rate as the transmission signal Tw. In another embodiment, for example, when the radar device 100 measures the target object OB by the FMCW method, the signal generator 101 generates a chirp signal including an up-chirp and a down-chirp as the transmission signal Tw.

The transmitter 102 is configured as an antenna that radiates the transmission signal Tw into space as an electromagnetic wave Ew. The receiver 103 is configured as an antenna that receives the electromagnetic wave Ew reflected by the object OB as a reception signal Dw. The electromagnetic waves Ew reflected by the object OB are hereinafter also referred to as reflected waves.

The beat signal generator 104 generates a beat signal Bw based on the transmission signal Tw and the reception signal Dw. The beat signal generator 104 in this embodiment is configured as a mixer that mixes the transmission signal Tw and the reception signal Dw to generate the beat signal Bw.

The sample signal generator 105 generates a sample signal Ts in a time domain or time frequency domain based on the beat signal Bw. In this embodiment, the sample signal generator 105 generates a time domain digital signal based on the beat signal Bw as the sample signal Ts. The sample signal generator 105 has a filter 106 and an analog-to-digital conversion unit 107.

The filter 106 passes only a beat signal Bw2 with a specific frequency band, of the beat signal Bw. The filter 106 in this embodiment is configured as a low-pass filter. In another embodiment, the filter 106 may be configured as, for example, a high-pass filter or a band-pass filter. The analog-to-digital conversion (ADC) unit 107 converts the beat signal Bw2, which is an analog signal, into the sample signal Ts, which is a digital signal in the time domain.

The control device 200 is configured as a computer including a CPU, a memory, and an input/output interface for inputting/outputting signals with the outside.

The control device 200 includes an interference signal processing unit 210 and a measurement processing unit 290. More specifically, the interference signal processing unit 210 and the measurement processing unit 290 in this embodiment are functional units implemented by the CPU executing a program stored in the memory of the control device 200. In another embodiment, the interference signal processing unit 210 and the measurement processing unit 290 may be configured as separate devices from the control device 200 that operate, for example, according to instructions from the CPU.

The interference signal processing unit 210 generates an interference-removed signal Ts4 based on the sample signal Ts. The interference-removed signal Ts4 corresponds to a signal obtained by removing the interference component Ci from the sample signal Ts. In this embodiment, the sample signal Ts is input from the sample signal generator 105 to the interference signal processing unit 210 via an input/output interface provided in the control device 200. The measurement processing unit 290 measures the object OB based on the generated interference-removed signal Ts4.

Figure 2:
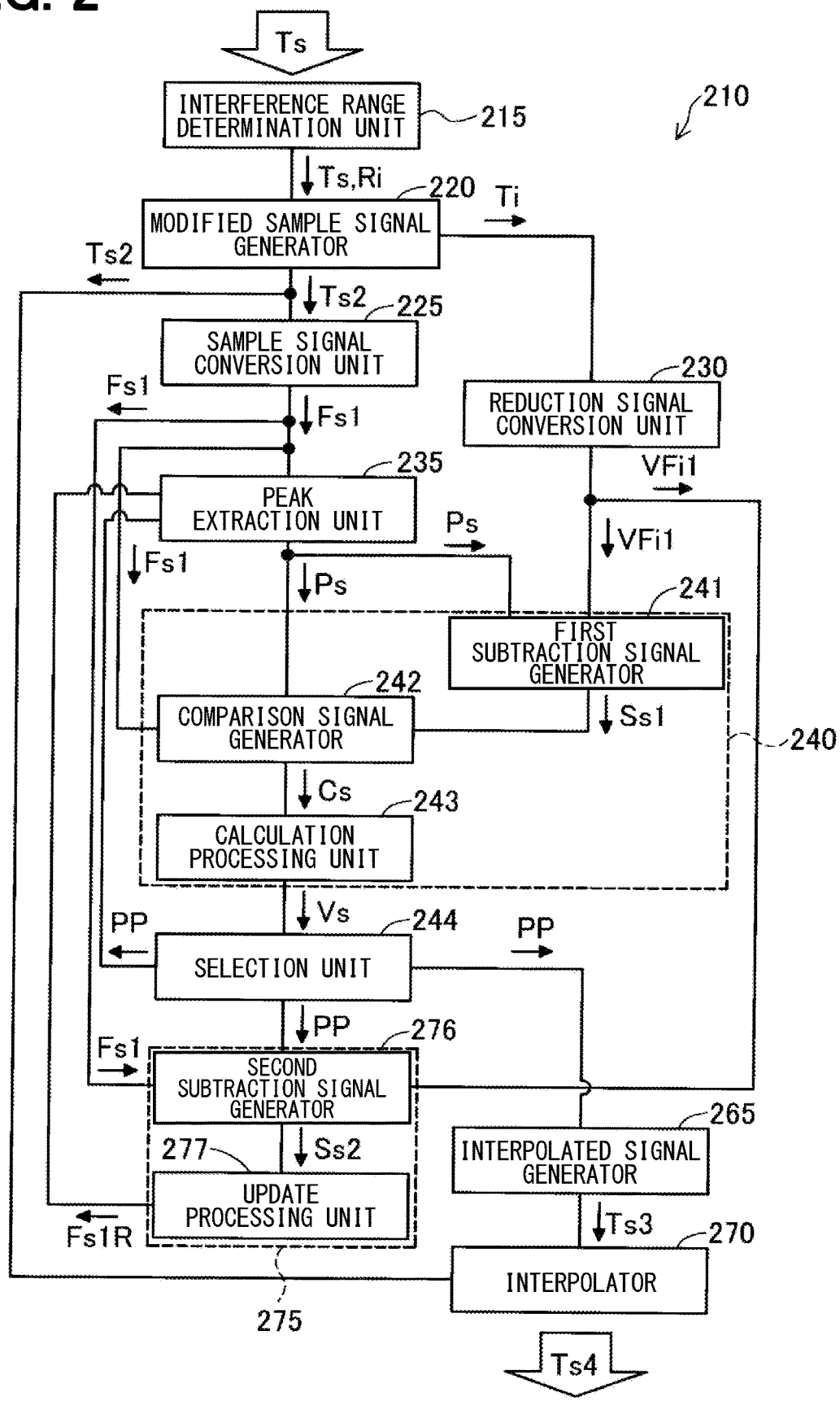
FIG. 2 is an explanatory diagram showing a schematic configuration of an interference signal processing unit according to the first embodiment.

As shown in FIG. 2, the interference signal processing unit 210 includes an interference range determination unit 215, a modified sample signal generator 220, a sample signal conversion unit 225, a reduction signal conversion unit 230, and an evaluation value calculator 240. The interference signal processing unit 210 in this embodiment has a peak extraction unit 235, a selection unit 244, an interpolated signal generator 265, an interpolator 270 and an updating unit 275. The evaluation value calculator 240 in this embodiment has a first subtraction signal generator 241, a comparison signal generator 242, and a calculation processing unit 243. The updating unit 275 has a second subtraction signal generator 276 and an update processing unit 277. In this embodiment, each part of the interference signal processing unit 210 is configured as a functional part realized by the control device 200 executing a program. In another embodiment, each part of the interference signal processing unit 210 may be implemented by, for example, a hardware circuit.

Figure 3:
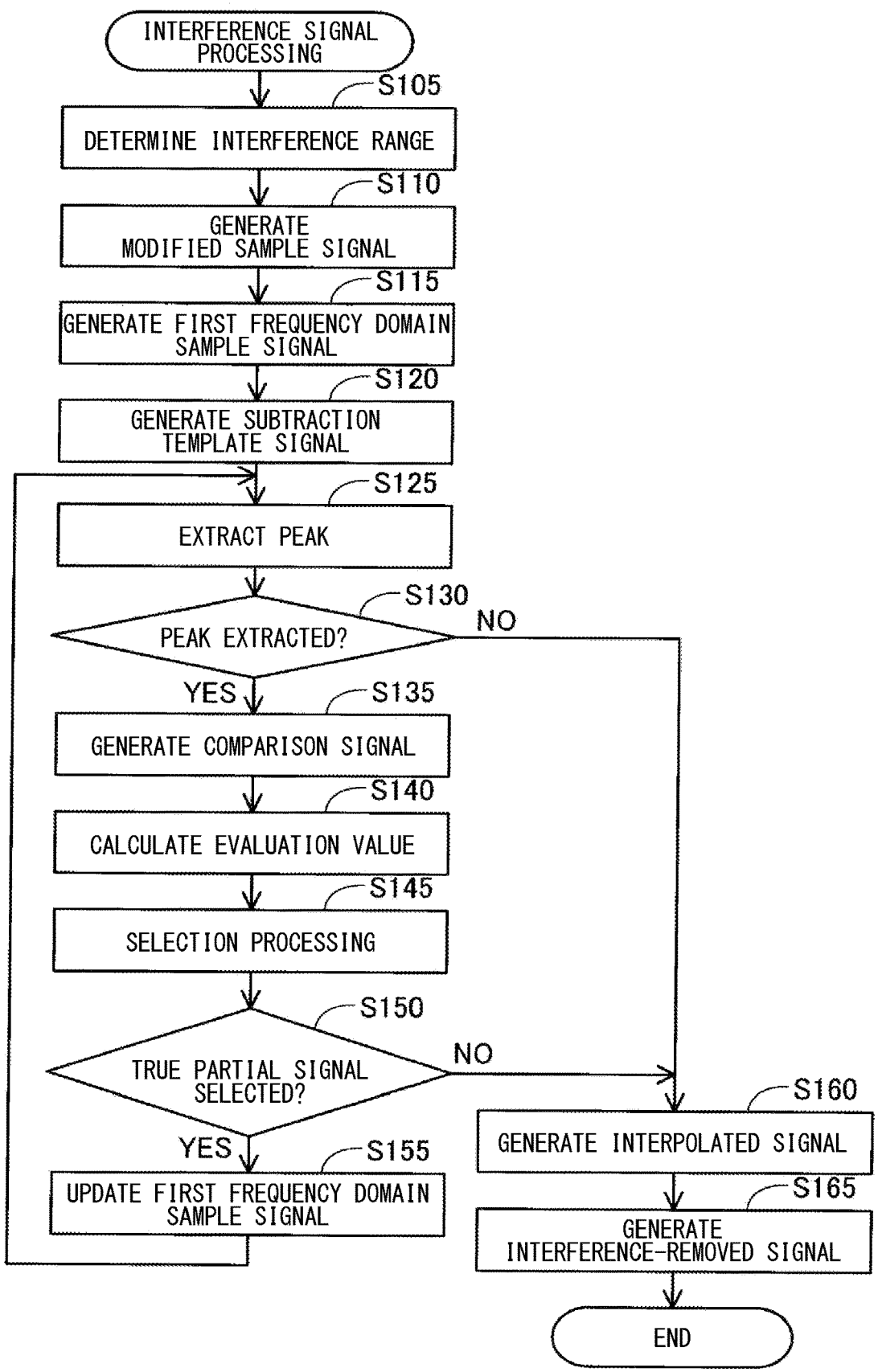
FIG. 3 is a flowchart of interference signal processing in the first embodiment.

The interference signal processing unit 210 in this embodiment generates the interference-removed signal Ts4 by executing the interference signal processing shown in FIG. 3. In this embodiment, the interference signal processing is executed each time the sample signal Ts is input to the interference signal processing unit 210.

Figure 4:
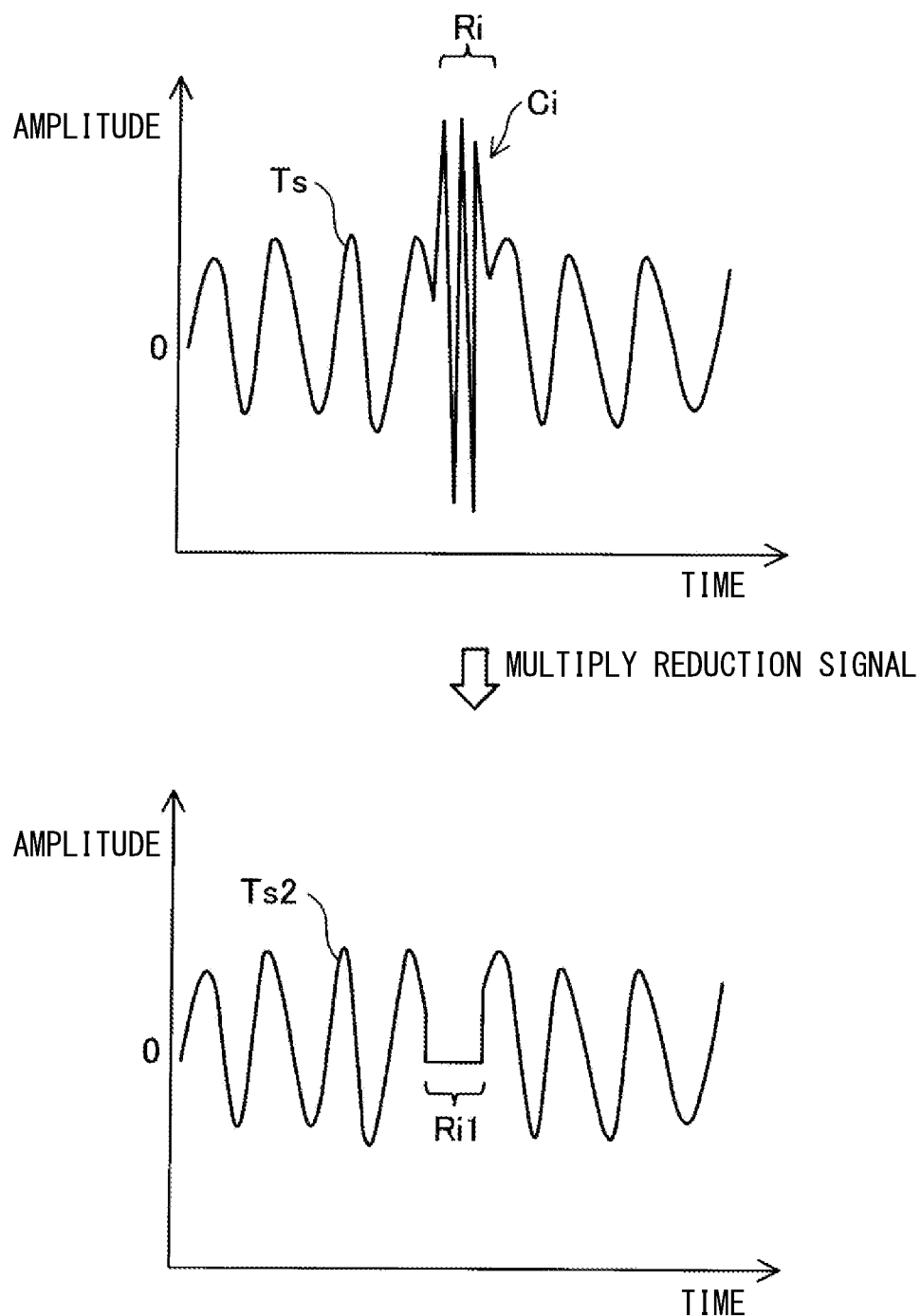
FIG. 4 is an explanatory diagram showing a sample signal and a modified sample signal.

In step S105, the interference range determination unit 215 determines an interference range Ri. The interference component Ci is included in the interference range Ri of the sample signal Ts. In this embodiment, the interference range Ri is determined as a time range in which the interference component Ci is included in the sample signal Ts. The upper part of FIG. 4 shows an example of spectrum of the sample signal Ts, with the horizontal axis representing time and the vertical axis representing amplitude. The upper part of FIG. 4 shows an example of the interference component Ci included in the sample signal Ts, and an example of the interference range Ri in the sample signal Ts. Such an interference component Ci is generated, for example, by electromagnetic waves transmitted from a radar device different from the radar device 100, such as a radar device mounted on another vehicle, interfering with the reception signal Dw.

The interference range determination unit 215 determines the interference range Ri using, for example, a known technique in step S105. More specifically, when the sample signal Ts includes the interference component Ci derived from the electromagnetic waves transmitted from another radar device, a chirp-shaped signal is generated in the range of the interference component Ci, and a sinusoidal signal is generated in the other range. The interference range determination unit 215 can determine the interference range Ri based on such a waveform difference. Since the signal intensity in the range containing the interference component Ci is usually higher than the signal intensity in the other range, the interference range Ri may be determined based on such a difference in signal intensity.

At step S110 in FIG. 3, the modified sample signal generator 220 multiplies the sample signal Ts, for which the interference range Ri has been identified at step S105, by a reduction signal Ti to generate a modified sample signal Ts2. The reduction signal Ti represents a signal for reducing the signal intensity of the interference range Ri. In the present embodiment, in step S110, the modified sample signal generator 220 uses the reduction signal Ti having a rectangular waveform in the time domain, in which the signal intensity is zero in the range corresponding to the interference range Ri, and the signal intensity is 1 in the other range corresponding to the other than the interference range Ri of the sample signal Ts. The lower part of FIG. 4 shows an example of spectrum of the modified sample signal Ts2 generated by multiplying the sample signal Ts by the reduction signal Ti. As shown in FIG. 4, in this embodiment, the sample signal Ts is multiplied by the reduction signal Ti in step S110, so as to generate the modified sample signal Ts2, in which the signal intensity is zero in the range Ri1 corresponding to the interference range Ri, and the signal intensity in the other range is similar to the sample signal Ts.

Figure 5:
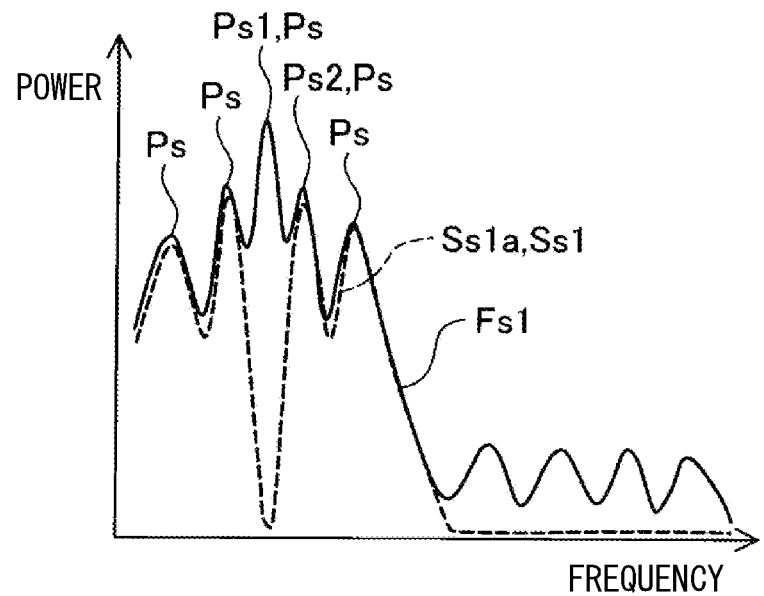
FIG. 5 is an explanatory diagram showing a first subtraction signal.

In step S115 of FIG. 3, the sample signal conversion unit 225 converts the modified sample signal Ts2 generated in step S110 into the first frequency domain sample signal Fs1 in the frequency domain, thereby obtaining the first frequency domain sample signal Fs1. In this embodiment, in step S115, the sample signal conversion unit 225 multiplies the modified sample signal Ts2 by a window function, and performs Fourier transformation to the signal multiplied by the window function to generate the first frequency domain sample signal Fs1. As the window function in step S115, for example, a general window function (Hamming window, Hanning window, Blackman window, etc.) is used. As the Fourier transformation in step S115, for example, a discrete Fourier transform (DFT) or a fast Fourier transform (FFT) is used. FIG. 5 shows an example of power spectrum of the first frequency domain sample signal Fs1, with frequency on the horizontal axis and power on the vertical axis.

In step S120, the reduction signal conversion unit 230 generates a subtraction template signal VFi1 by converting the reduction signal Ti into the subtraction template signal VFi1 in the frequency domain. In this embodiment, in step S120, the reduction signal conversion unit 230 generates the subtraction template signal VFi1 by Fourier transformation to the reduction signal Ti in the same manner as in step S115. The subtraction template signal VFi1 includes a main lobe and sidelobes and has symmetry around the zero frequency, like the Fourier transform of a general window function. A frequency range of the subtraction template signal VFi1 including at least a frequency with the largest amplitude is also called a first range or a second range. The second range may be the same frequency range as the first range, or may be a different frequency range. However, the second range is preferably the same as or wider than the first range.

At step S125, the peak extraction unit 235 extracts at least one peak Ps included in the first frequency domain sample signal Fs1. In this embodiment, in step S125, the peak extraction unit 235 extracts a peak Ps indicating a power value equal to or greater than a predetermined value, of the peak Ps included in the first frequency domain sample signal Fs1, and records the frequency position of the extracted peak Ps in the memory. FIG. 5 shows five peaks Ps as an example of the peak Ps extracted in step S125. A frequency range including the peak Ps extracted in step S125 is also called a peak range. The peak range of each peak in this embodiment corresponds to a half width of each peak Ps. In another embodiment, the peak range may be narrower or wider than the range corresponding to the half width of the peak Ps. In another embodiment, the peak Ps may be extracted in step S125, for example, based on the absolute value of the signal.

At step S130 in FIG. 3, the peak extraction unit 235 determines whether or not the peak Ps is extracted at step S125.

When it is determined in step S130 that the peak Ps has been extracted, in steps S135 and S140, the evaluation value calculator 240 calculates the evaluation value Vs based on the first frequency domain sample signal Fs1 and the subtraction template signal VFi1. The evaluation value Vs represents a value for determining whether or not a partial signal representing at least part of the first frequency domain sample signal Fs1 is derived from a reflected wave. It should be noted that when a certain partial signal does not originate from a reflected wave, it means that the partial signal is generated by multiplication of the reduction signal Ti. A partial signal derived from a reflected wave is hereinafter also referred to as a "true partial signal". Further, the processing for calculating the evaluation value Vs, such as steps S135 and S140 in the present embodiment, is also called "evaluation value calculation processing".

In the present embodiment, the evaluation value calculator 240 calculates a value for determining whether the partial signal in each peak range is a true partial signal for each peak Ps extracted in step S125 as the evaluation value Vs in the evaluation value calculation processing. That is, in the present embodiment, the partial signal in each peak range is a target for calculating the evaluation value Vs and a target for determination based on the evaluation value Vs. More specifically, one evaluation value Vs is calculated corresponding to one peak Ps, and the partial signal in the peak range of the peak Ps is subjected to determination based on the evaluation value Vs. A partial signal to be determined based on the evaluation value Vs is hereinafter also referred to as a target partial signal.

In this embodiment, the evaluation value calculator 240 generates a comparison signal Cs in step S135. More specifically, the evaluation value calculator 240 first generates the first subtraction signal Ss1 in step S135. The first subtraction signal Ss1 is obtained by correcting the frequency position and frequency components (amplitude and phase) of the subtraction template signal VFi1 based on the frequency position and frequency components of the target partial signal respectively in the first range. In this embodiment, the first subtraction signal Ss1 has symmetry around the frequency position of the peak Ps corresponding to the target partial signal. In the present embodiment, the first range corresponds to the entire frequency range of the subtraction template signal VFi1. Next, the evaluation value calculator 240 generates the comparison signal Cs by subtracting the first subtraction signal Ss1 from the first frequency domain sample signal Fs1.

Figure 6:
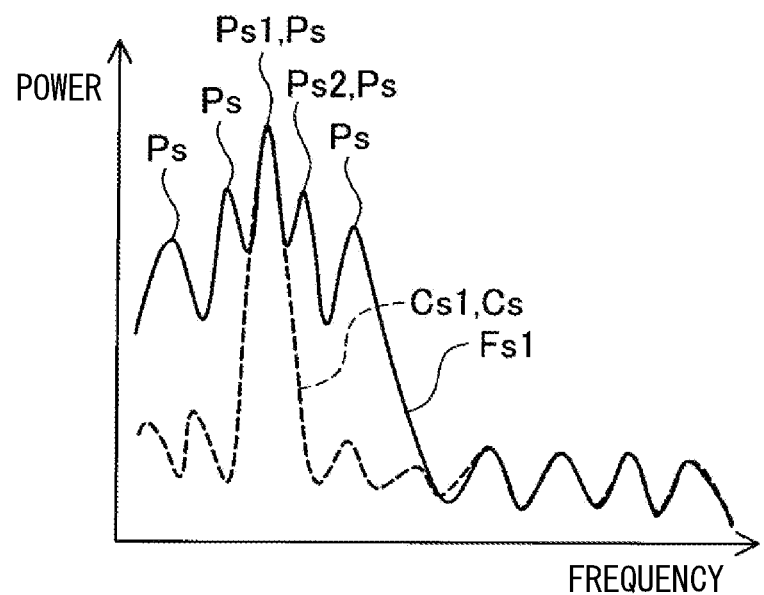
FIG. 6 is an explanatory diagram showing a first example of a comparison signal.
Figure 7:
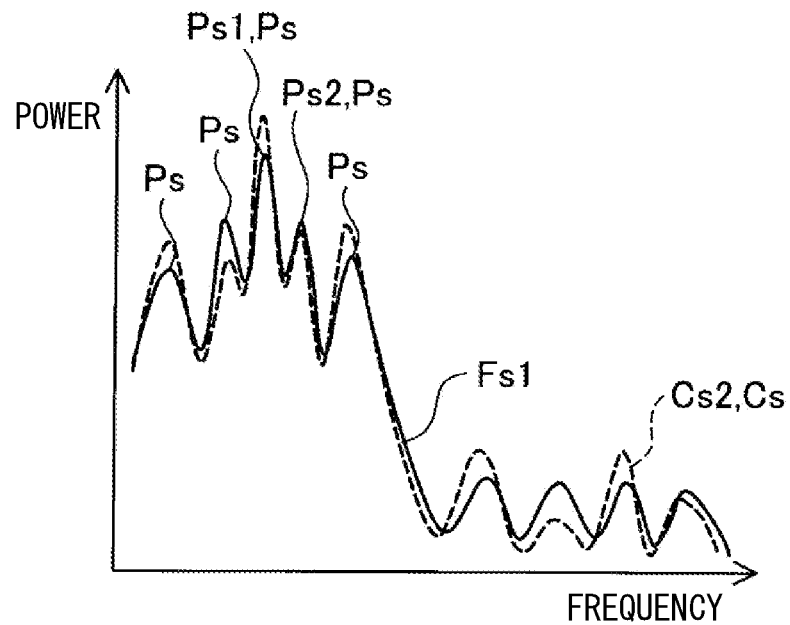
FIG. 7 is an explanatory diagram showing a second example of a comparison signal.

As an example of the first subtraction signal Ss1 generated in step S135, FIG. 5 shows the power spectrum of the first subtraction signal Ss1a regarding the peak Ps1 having the largest power value among the five peaks Ps. Further, FIG. 6 shows the power spectrum of the comparison signal Cs1 related to the peak Ps1 as an example of the comparison signal Cs. FIG. 7 shows the power spectrum of the comparison signal Cs2 related to the peak Ps2 located adjacent to the peak Ps1 on the high frequency side of the peak Ps1.

As shown in FIGS. 6 and 7, the difference between the first frequency domain sample signal Fs1 and the comparison signal Cs1 is greater than the difference between the first frequency domain sample signal Fs1 and the comparison signal Cs2. The reason for this is described as following. The partial signal in the peak range of the peak Ps1 is the true partial signal. The first subtraction signal Ss1a is subtracted from the first frequency domain sample signal Fs1. The sidelobe convolved for the partial signal in the peak range of the peak Ps1 is subtracted from the first frequency domain sample signal Fs1. This sidelobe arises from the multiplication of the sample signal Ts by the reduction signal Ti performed in step S110. On the other hand, the sidelobes are not convoluted with partial signals that are not true partial signals, and the frequency components of the first subtraction signal Ss1 for such partial signals do not correspond to the frequency components of the first frequency domain sample signal Fs1. Therefore, as shown in FIG. 7, the difference between the first frequency domain sample signal Fs1 and the comparison signal Cs generated by subtracting the first subtraction signal Ss1 for the partial signal that is not the true partial signal from the first frequency domain sample signal Fs1 becomes small.

Figure 8:
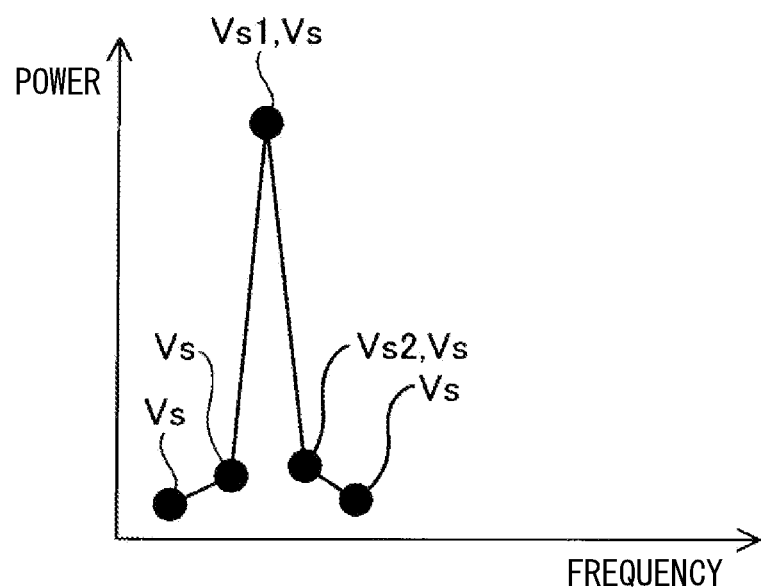
FIG. 8 is an explanatory diagram showing an example of an evaluation value.

In step S140, the calculation processing unit 243 of the evaluation value calculator 240 calculates the evaluation value Vs. In the present embodiment, the evaluation value calculator 240 calculates the evaluation value Vs for each peak Ps extracted in step S125 based on the difference between the first frequency domain sample signal Fs1 and the comparison signal Cs calculated in step S135. More specifically, the evaluation value calculator 240 calculates the evaluation value Vs as the sum of the differences between the absolute value of the first frequency domain sample signal Fs1 and the absolute value of the comparison signal Cs. Therefore, the evaluation value Vs reflects the difference between the first frequency domain sample signal Fs1 and the comparison signal Cs, and the evaluation value Vs increases as the difference increases. FIG. 8 shows five evaluation values Vs regarding the five peaks Ps described above as examples of the evaluation values Vs. In the example of FIG. 8, the evaluation value Vs1 for the peak Ps1 is the largest among the five evaluation values Vs.

In step S145, the selection unit 244 executes selection processing. The selection processing refers to a process of selecting one or plural partial signals as true partial signal based on the evaluation value Vs and recording information about the frequency position of the selected partial signal. A partial signal selected in the selection processing is called a selected partial signal. The selected partial signal can also be said to be a partial signal determined to be the true partial signal. Information about the frequency position of the selected partial signal recorded in the selection processing is called frequency position information PP.

In this embodiment, in step S145, the selection unit 244 first extracts the evaluation value Vs equal to or greater than a predetermined reference value among the evaluation values Vs calculated in step S140. Next, the selection unit 244 selects one evaluation value Vs that is the largest among the extracted evaluation values Vs, and selects a partial signal in the peak range of one peak Ps having the evaluation value Vs as a true partial signal. After that, the selection unit 244 records the frequency position of the peak Ps in the memory of the control device 200 as the frequency position information PP. For example, in the example of FIG. 8, the partial signal in the peak range of the peak Ps1 of the peak Ps is selected as the true partial signal, and the frequency position of the peak Ps1 is recorded as the frequency position information PP. Note that if there is no evaluation value Vs equal to or greater than the predetermined reference value in step S145, the selection unit 244 advances the process to step S150 without selecting the true partial signal.

In step S150, the selection unit 244 determines whether or not a true partial signal was selected in step S145, that is, whether or not there is a selected partial signal in the previous selection processing.

If it is determined in step S150 that the true partial signal has been selected, in step S155, the updating unit 275 updates the first frequency domain sample signal Fs1 to generate the updated signal Fs1R. More specifically, the updating unit 275 first generates the second subtraction signal Ss2 in step S155. The second subtraction signal Ss2 is generated by correcting the frequency position and frequency component of the subtraction template signal VFi1 in the second range based on the frequency position and frequency component of the selected partial signal, respectively. In this embodiment, the second subtraction signal Ss2 has symmetry around the frequency position of the peak Ps corresponding to the selected partial signal. In this embodiment, the second range, like the first range, corresponds to the entire frequency range of the subtraction template signal VFi1. Next, the updating unit 275 generates an updated signal Fs1R by subtracting the second subtraction signal Ss2 from the first frequency domain sample signal Fs1.

Figure 9:
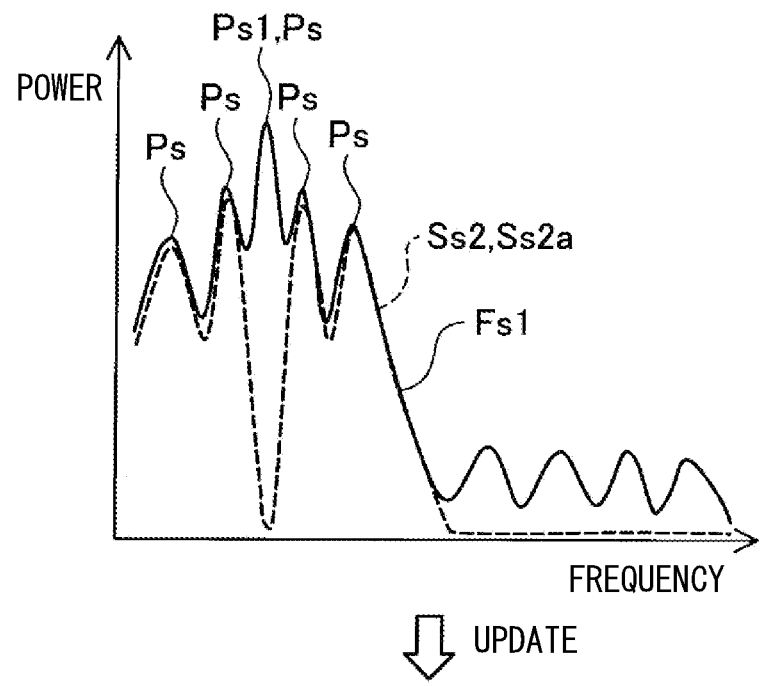
FIG. 9 is an explanatory diagram showing a second subtraction signal and an updated signal.
Figure 9:
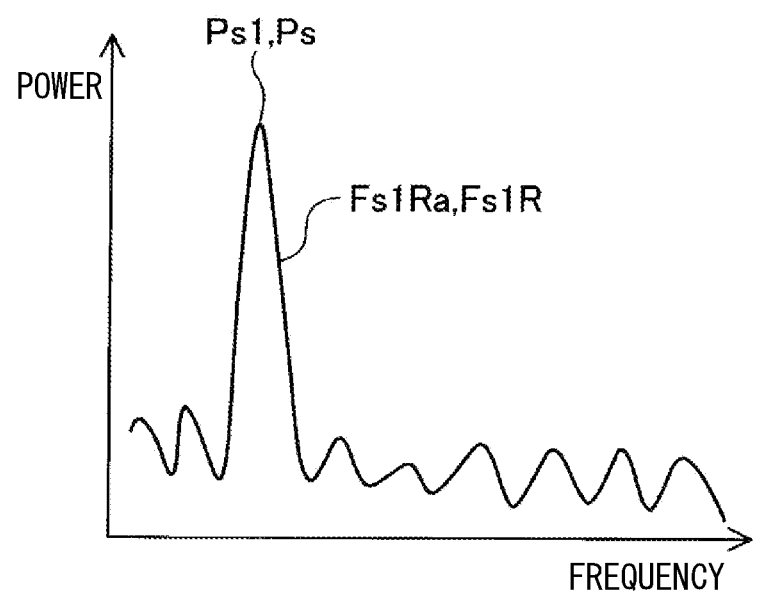

The upper part of FIG. 9 shows the power spectrum of the second subtraction signal Ss2a regarding the partial signal in the peak range of the peak Ps1 as an example of the second subtraction signal Ss2 generated in step S155. The lower part of FIG. 9 shows the power spectrum of the updated signal Fs1Ra as an example of the updated signal Fs1R generated in step S155. As shown in FIGS. 5 and 9, in this embodiment, the first subtraction signal Ss1 regarding a certain peak Ps and the second subtraction signal Ss2 regarding the peak Ps are the same signals. In another embodiment, the first subtraction signal Ss1 and the second subtraction signal Ss2 may be different signals, for example, when the first range and the second range are different ranges.

Next, the interference signal processing unit 210 returns to step S125. In step S125, which is executed again, the peak extraction unit 235 extracts at least one peak Ps included in the updated signal Fs1R. In step S125, which is executed again, the peak extraction unit 235 excludes the peak Ps corresponding to the frequency position of the selected partial signal selected in the previous selection processing, that is, the peak Ps corresponding to the frequency position included in the frequency position information PP from the peak extraction targets. Therefore, in the example shown in FIG. 9, the peak Ps1 included in the updated signal Fs1Ra is excluded from the peak extraction targets. Further, when a new partial signal is selected as the true partial signal in the selection processing in step S145 that is executed again, the information on the frequency position of the newly selected partial signal is accumulated and recorded as frequency position information PP together with information related to the previously recorded frequency position information.

As shown in FIG. 3, in this embodiment, until it is determined in step S130 that no peak Ps is extracted, or until it is determined in step S150 that no true partial signal is selected, step S125 to step S155 is repeatedly executed, and the first frequency domain sample signal Fs1 is repeatedly updated. In this way, by repeatedly updating the first frequency domain sample signal Fs1, the signals derived from the sidelobes included in the first frequency domain sample signal Fs1 are subtracted. Therefore, it is possible to more accurately determine whether the partial signal included in the first frequency domain sample signal Fs1 is the true partial signal, and to more effectively detect the true partial signal.

If it is determined in step S130 that no peak Ps is extracted, or if it is determined in step S150 that no true partial signal is selected, then in step S160, the interpolated signal generator 265 generates the interpolated signal Ts3 based on the frequency positions of all the selected partial signals selected in the previous selection processing, that is, based on all the frequency positions included in the frequency position information PP. The interpolated signal Ts3 is a time-domain signal for interpolating the range Ri1 corresponding to the interference range Ri in the modified sample signal Ts2. More specifically, in the present embodiment, the interpolated signal generator 265 performs inverse Fourier transform on all partial signals determined as true partial signals in step S160, and appropriately corrects the amplitude of each signal subjected to the inverse Fourier transform. Then, the interpolated signal generator 265 generates the interpolated signal Ts3 by adding these signals. The frequency position and width of the range Ri1 are the same as the frequency position and width of the interference range Ri, respectively. In another embodiment, the interpolated signal Ts3 based on each true partial signal may be individually generated by inverse Fourier transforming each of the partial signals determined to be true partial signals.

In step S165, the interpolator 270 interpolates the modified sample signal Ts2 based on the interpolated signal Ts3 generated in step S160 to generate the interference-removed signal Ts4. More specifically, in this embodiment, the interpolator 270 generates the interference-removed signal Ts4 in step S165 by adding the interpolated signal Ts3 to the modified sample signal Ts2 in the range Ri1. As a result, the interference-removed signal Ts4 is generated such that the time-domain signal based on the partial signal determined to be the true partial signal is included in the corresponding range. More specifically, the interference-removed signal Ts4 is generated so that the time-domain signal generated based on the frequency position of the selected partial signal is included in the corresponding range. Note that the corresponding range refers to a range of the interference-removed signal Ts4 corresponding to the interference range Ri. More specifically, the frequency position and width of the correspondence range are the same as the frequency position and width of the interference range Ri, respectively.

The measurement processing unit 290 measures the object OB based on the interference-removed signal Ts4 generated by the interference signal processing. For example, the measurement processing unit 290 analyzes the interference-removed signal Ts4 while appropriately processing it using Fourier transform or the like, thereby measuring the distance, angle, and speed relative to the object OB that reflected the electromagnetic wave Ew.

According to the radar device 100 of the present embodiment, the evaluation value calculator 240 calculates the evaluation value Vs based on the first frequency domain sample signal Fs1 and the subtraction template signal VFi1 so as to determine whether the partial signal is a true partial signal. The interference signal processing unit 210 generates the interference-removed signal Ts4 such that the time-domain signal based on the partial signal determined to be the true partial signal is included in the corresponding range of the interference-removed signal Ts4. Thus, it is possible to determine whether or not the partial signal is a true partial signal based on the evaluation value Vs calculated based on the first frequency domain sample signal Fs1 and the subtraction template signal VFi1. Therefore, it is possible to reduce the possibility that the sidelobe included in the first frequency domain sample signal Fs1 is erroneously determined as a true partial signal. As a result, it is possible to reduce the possibility that the sidelobe is erroneously determined as the true partial signal even if the intensity of the peak corresponding to these sidelobe appears to be greater than the intensity of the peak related to the true partial signal, for example, since plural sidelobes contained in the first frequency domain sample signal Fs1 strengthen each other. In addition, the possibility of measuring the object OB with high accuracy increases by measuring the object OB based on the interference-removed signal Ts4, for example, compared with a case where the object OB is detected using signals interpolated by the partial signal estimated to be a true partial signal simply based on the intensity.

In the present embodiment, the evaluation value calculator 240 generates the comparison signal Cs by subtracting the first subtraction signal Ss1 from the first frequency domain sample signal Fs1, and calculates the evaluation value Vs based on the difference between the first frequency domain sample signal Fs1 and the comparison signal Cs. Thus, the evaluation value Vs can be calculated based on the difference between the first frequency domain sample signal Fs1 and the comparison signal Cs.

In the present embodiment, the evaluation value calculator 240 calculates the evaluation value Vs as the sum of the differences between the absolute value of the first frequency domain sample signal Fs1 and the absolute value of the comparison signal Cs. As a result, the evaluation value Vs can be easily calculated as a value reflecting the difference in amplitude and phase between the first frequency domain sample signal Fs1 and the comparison signal Cs. Thus, it is possible to determine whether or not the partial signal is a true partial signal more accurately.

In this embodiment, the interference signal processing unit 210 has the peak extraction unit 235 that extracts at least one peak Ps included in the first frequency domain sample signal Fs1. The evaluation value calculator 240 calculates the evaluation value Vs so as to determine whether or not the partial signal in the peak range is a true partial signal for each extracted peak Ps. As a result, since the evaluation value Vs is calculated for each peak Ps, the evaluation value Vs can be calculated more efficiently, for example, compared with a case where the evaluation value Vs is calculated for the entire signal value of the first frequency domain sample signal Fs1.

In the present embodiment, the interference signal processing unit 210 has the selection unit 244 configured to select one or plural partial signals as true partial signal based on the evaluation value Vs, and record the frequency position information PP of the selected partial signal. The interference signal processing unit 210 generates the interference-removed signal Ts4 such that a time-domain signal generated based on the frequency position of the selected partial signal is included in the corresponding range. Thus, the one or plural partial signals can be selected as true partial signal based on the evaluation value Vs, and the interference-removed signal Ts4 can be generated so that the corresponding range is interpolated based on the frequency position of the selected partial signal. Further, since the frequency position information PP of the selected partial signal is recorded, the interpolation of the modified sample signal Ts2 and the updating of the first frequency domain sample signal Fs1 can be easily executed by referring to the recorded frequency position information PP.

In this embodiment, the interference signal processing unit 210 has the interpolated signal generator 265 that generates the interpolated signal Ts3 based on the frequency position of the selected partial signal. The interference signal processing unit 210 generates the interference-removed signal Ts4 by interpolating the modified sample signal Ts2 based on the interpolated signal Ts3. Therefore, the noise included in the corresponding range of the interference-removed signal Ts4 can be reduced, since the modified sample signal Ts2 is interpolated based on the interpolated signal Ts3, for example, compared with a case where the interference-removed signal Ts4 is directly generated by transforming the last generated updated signal Fs1R into the time domain.

In the present embodiment, the updating unit 275 updates the first frequency domain sample signal Fs1 by subtracting the second subtraction signal Ss2 from the first frequency domain sample signal Fs1. As a result, the calculation of the evaluation value Vs and the determination of the partial signal based on the evaluation value Vs can be repeatedly performed using the updated signal Fs1R as a new first frequency domain sample signal Fs1. Therefore, it is possible to more accurately determine whether the partial signal included in the first frequency domain sample signal Fs1 is a true partial signal, and the possibility of accurately measuring the object OB increases.

B. Second Embodiment

Figure 10:
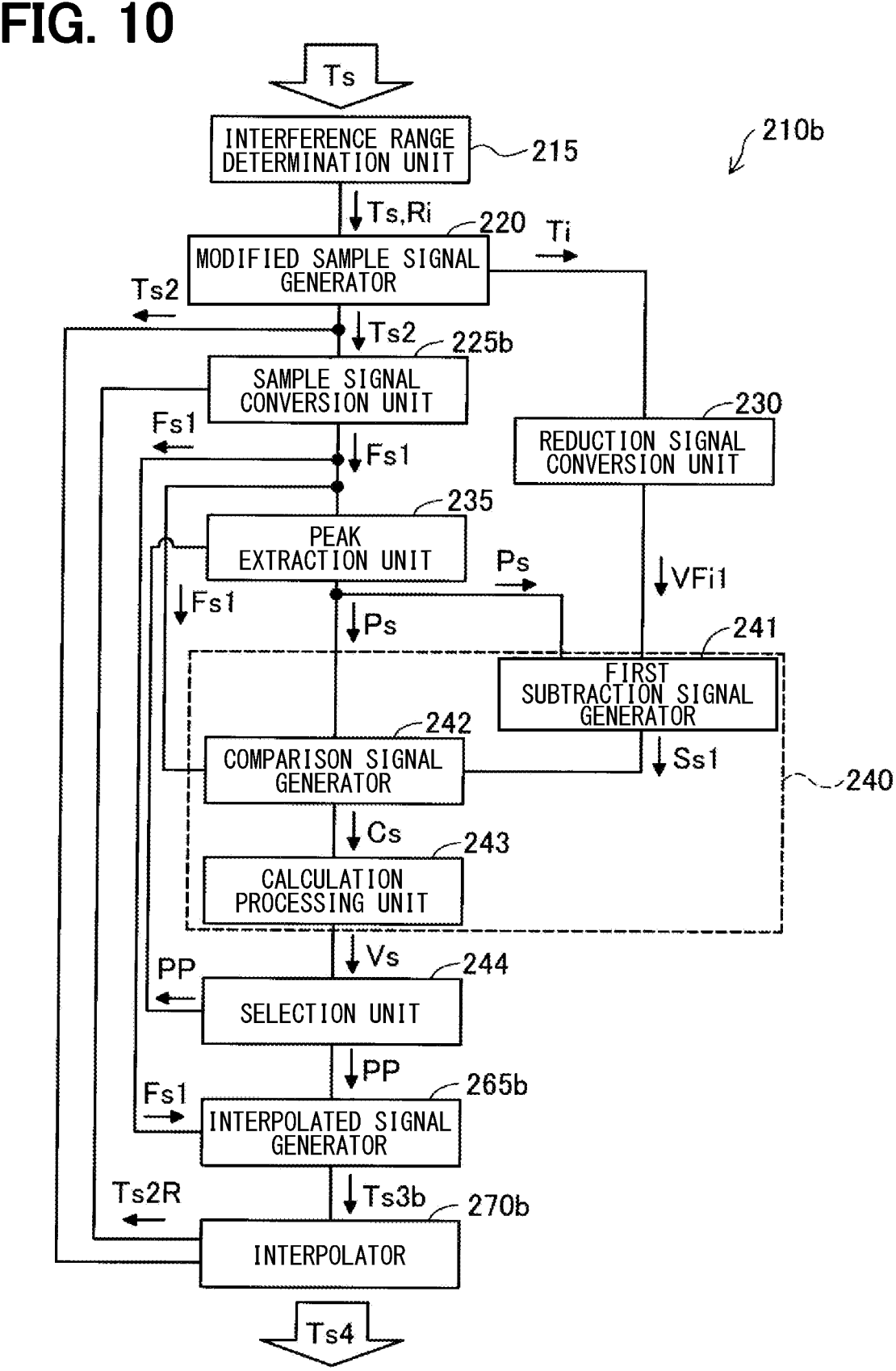
FIG. 10 is an explanatory diagram showing a schematic configuration of an interference signal processing unit according to a second embodiment.

As shown in FIG. 10, the interference signal processing unit 210b in the second embodiment does not have the updating unit 275 unlike the first embodiment. Further, in the present embodiment, the interference signal processing unit 210b repeatedly interpolates the modified sample signal Ts2 and generates the interference-removed signal Ts4 based on the interpolated modified sample signal Ts2. Of the configuration of the radar device 100b in the second embodiment, the points that are not particularly described are the same as in the first embodiment.

Figure 11:
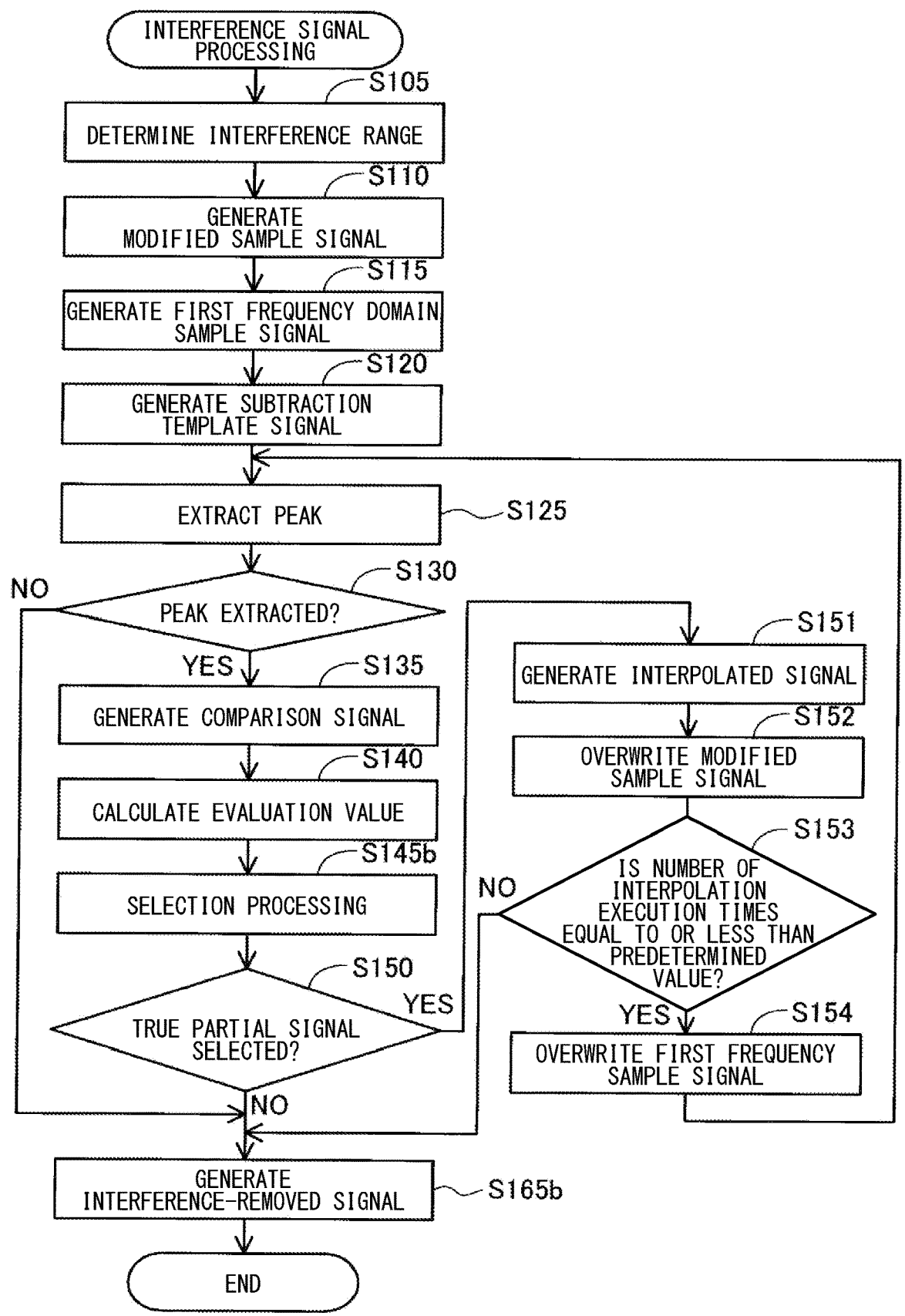
FIG. 11 is a flowchart of interference signal processing in the second embodiment.

The interference signal processing unit 210b in this embodiment generates the interference-removed signal Ts4 by executing the interference signal processing shown in FIG. 11. In FIG. 11, steps similar to those in FIG. 3 described in the first embodiment are assigned the same reference numerals as in FIG. 3.

In step S145b in the present embodiment, unlike step S145 in FIG. 3 described in the first embodiment, the selection unit 244 selects all of the peaks Ps having the evaluation value Vs equal to or greater than a predetermined reference value, and selects a partial signal in each peak range of the selected peak Ps as partial signal. Also, the selection unit 244 records the frequency position of each peak Ps.

When it is determined in step S150 that the true partial signal is selected, the interpolated signal generator 265 generates the interpolated signal Ts3b in step S151. The process executed in step S151 is the same as the process executed in step S160 of FIG. 3.

In step S152, the interpolator 270 interpolates the modified sample signal Ts2 based on the interpolated signal Ts3b generated in step S151 to generate the interpolated sample signal Ts2R, and overwrites the modified sample signal Ts2 with the interpolated sample signal Ts2R. Also, in step S152, the interpolator 270 records the number of interpolation execution times in the memory. The number of interpolation execution times refers to the cumulative number of interpolations of the modified sample signal Ts2 based on the interpolated signal Ts3b. For example, in step S152, which is executed first in the interference signal processing, "one time" is recorded as the number of interpolation execution times.

In step S153, the interpolator 270 determines whether or not the number of interpolation execution times is equal to or less than a predetermined number of times.

When it is determined in step S153 that the number of interpolation execution times is equal to or less than the predetermined number of times, the sample signal conversion unit 225 converts the modified sample signal Ts2 overwritten by the interpolated sample signal Ts2R into a frequency domain signal by Fourier transform or the like, and overwrites the first frequency domain sample signal Fs1 with the transformed signal in step S154. Then, in steps after step S125 that are executed again, the overwritten first frequency domain sample signal Fs1 is processed as the first frequency domain sample signal Fs1. The process executed in step S154 is substantially the same as the process executed in step S115, except that the interpolated sample signal Ts2R is converted.

As shown in FIG. 11, in this embodiment, steps S125 to S154 are repeatedly executed until it is determined in step S130 that no peak Ps is extracted, until it is determined in step S150 that no true partial signal is selected, or until it is determined in step S153 that the number of interpolation execution times is not equal to or less than the predetermined number. As a result, the conversion from the modified sample signal Ts2 to the first frequency domain sample signal Fs1 and the conversion from the first frequency domain sample signal Fs1 to the modified sample signal Ts2 are repeatedly executed, and the interpolation of the modified sample signal Ts2 based on the interpolated signal Ts3b is repeatedly executed. A method of interpolating a signal by repeatedly performing transformation from the time domain to the frequency domain and its inverse transformation in this way is also called Iterative Method with Adaptive Thresholding (IMAT).

When no peak is extracted in step S130, when a true partial signal is not determined in step S150, or when it is determined in step S153 that the number of interpolation execution times is not equal to or less than a predetermined number, the interpolator 270 generates the interference-removed signal Ts4 in step S165b, based on the modified sample signal Ts2 at that time, that is, the last generated interpolated sample signal Ts2R. In the present embodiment, the interpolator 270 uses the modified sample signal Ts2 at that time as the interference-removed signal Ts4. As a result, as in the first embodiment, the interference-cancelled signal Ts4 is generated such that the time-domain signal corresponding to the partial signal determined to be the true partial signal is included in the corresponding range.

The second embodiment also reduces the possibility that the sidelobe included in the first frequency domain sample signal Fs1 is erroneously determined as a true partial signal. Moreover, the possibility that the object OB can be measured with higher accuracy increases by measuring the object OB based on the interference-removed signal Ts4.

C. Third Embodiment

Figure 12:
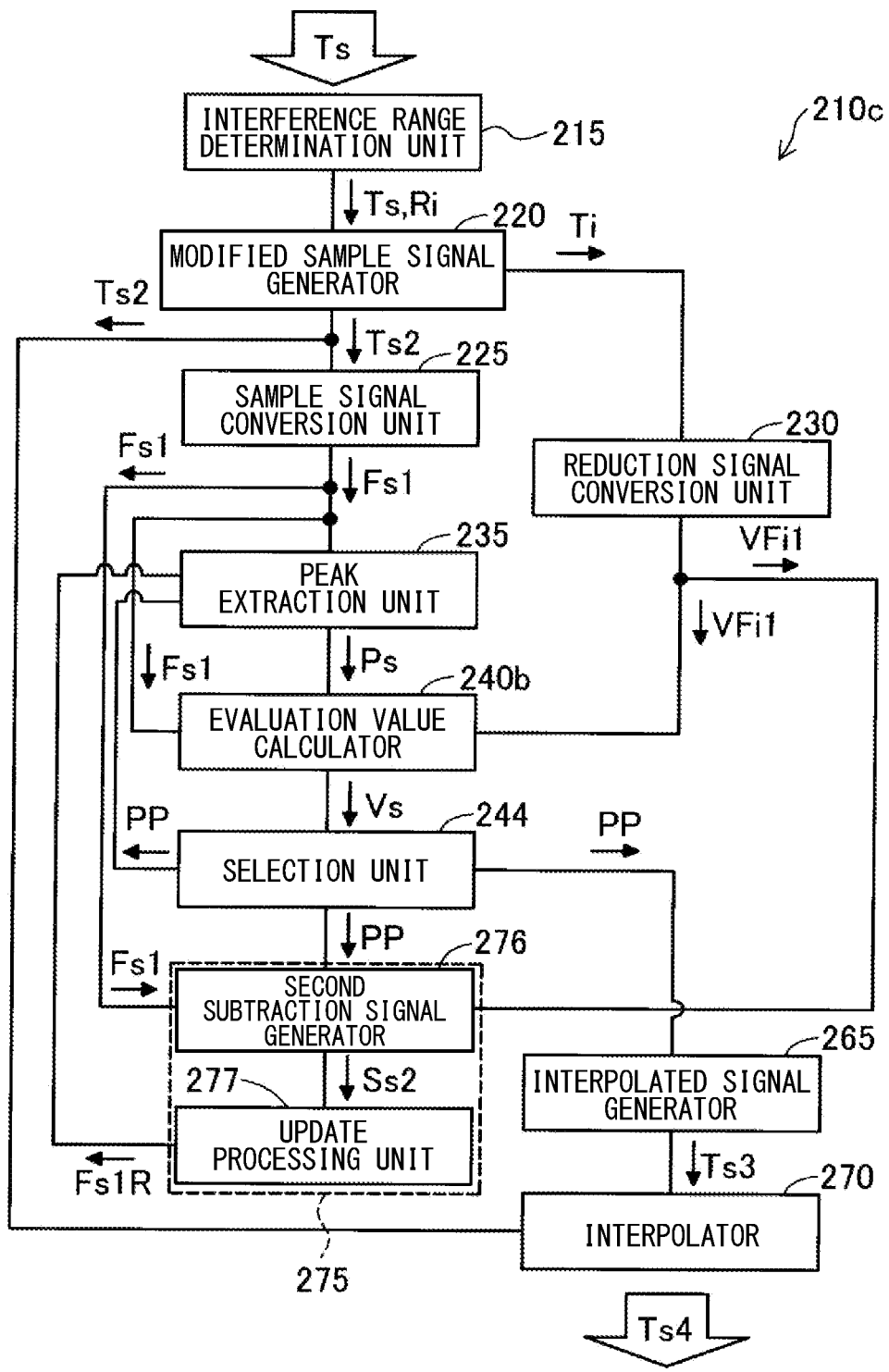
FIG. 12 is an explanatory diagram showing a schematic configuration of an interference signal processing unit according to a third embodiment.

As shown in FIG. 12, unlike the first embodiment, the evaluation value calculator 240b of the interference signal processing unit 210c in the third embodiment does not have the first subtraction signal generator 241, the comparison signal generator 242, and the calculation processing unit 243. Further, in the present embodiment, the evaluation value calculator 240b calculates the evaluation value Vs based on the cross-correlation function between at least part of the first frequency domain sample signal Fs1 and at least part of the subtraction template signal VFi1. Of the configuration of the radar device 100c in the third embodiment, the points that are not particularly described are the same as in the first embodiment.

Figure 13:
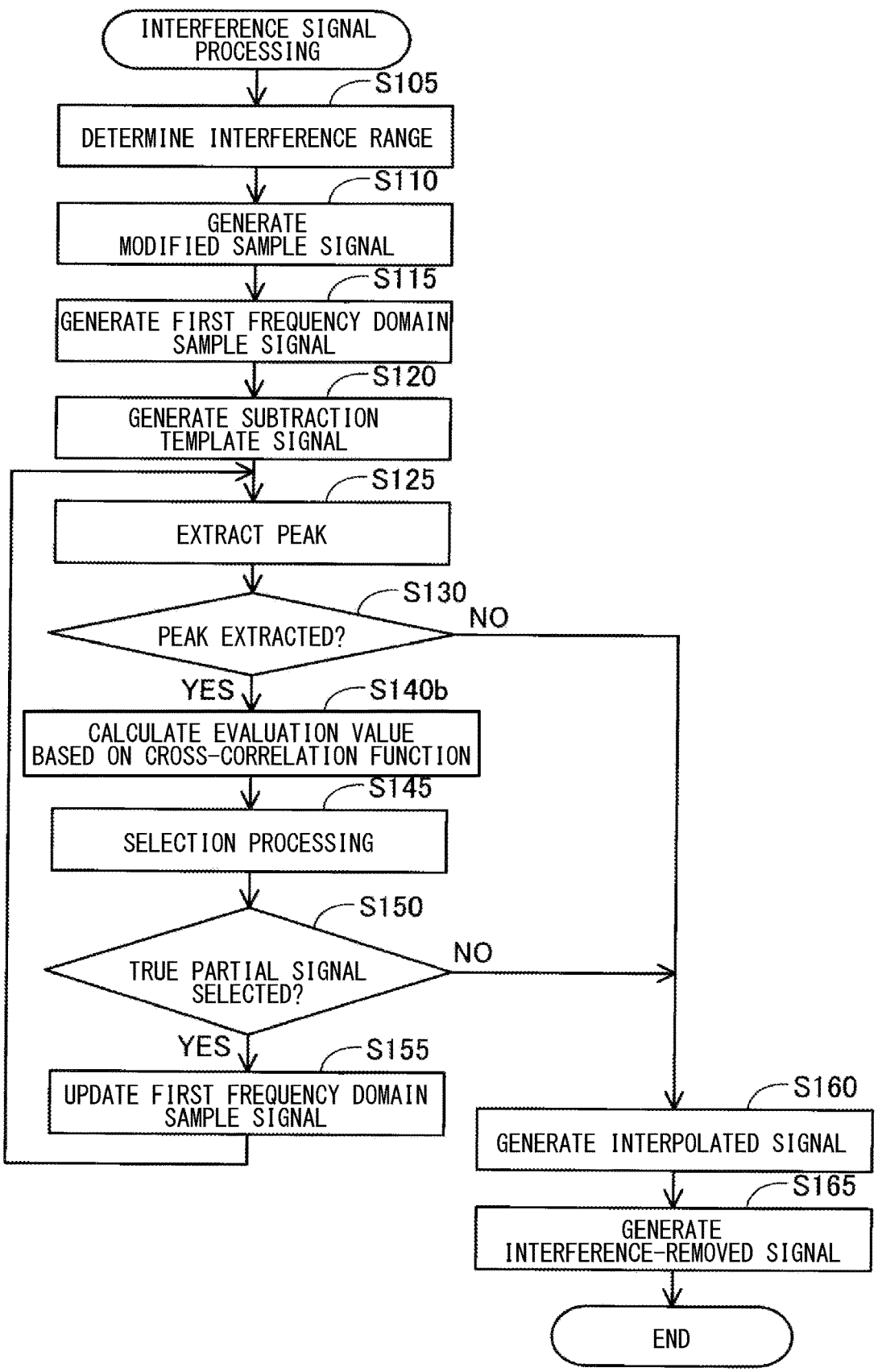
FIG. 13 is a flowchart of interference signal processing in the third embodiment.

The interference signal processing unit 210b in this embodiment generates the interference-removed signal Ts4 by executing the interference signal processing shown in FIG. 13. In FIG. 13, steps similar to those in FIG. 3 described in the first embodiment are assigned the same reference numerals as in FIG. 3.

In this embodiment, when it is determined that a peak is extracted in step S130, the evaluation value calculator 240b calculates the evaluation value Vs in step S140b. In this embodiment, the evaluation value calculator 240b calculates the evaluation value Vs for a certain partial signal as a value of the cross-correlation function between the first frequency domain sample signal Fs1 and the subtraction template signal VFi1 in step S140b. Each partial signal of the first frequency domain sample signal Fs1 is convoluted with sidelobes resulting from the multiplication of the sample signal Ts by the reduction signal Ti. Therefore, when the frequency position of the main lobe of the reduction signal Ti overlaps with the frequency positions of the true partial signals of the sample signal Ts, the value of the cross-correlation function is larger compared with a case where the frequency positions of the main lobe of the reduction signal Ti overlaps with the frequency positions of the sidelobes of the sample signal Ts. Therefore, for example, the evaluation value Vs for the true partial signal described above is larger than the evaluation value Vs for the sidelobe. In this way, it is possible to determine whether or not the partial signal is a true partial signal based on the evaluation value Vs calculated based on the cross-correlation function.

According to the third embodiment, the evaluation value calculator 240b calculates the evaluation value V based on the cross-correlation function of at least a portion of the first frequency domain sample signal Fs1 and at least a portion of the subtraction template signal VFi1. Therefore, the evaluation value Vs can be calculated more easily based on the cross-correlation function between at least part of the first frequency domain sample signal Fs1 and at least part of the subtraction template signal VFi1.

In another embodiment, the interference signal processing unit 210c calculates the evaluation value Vs based on, for example, the cross-correlation function, and then generates the interference-removed signal Ts4 by the IMAT method in the same manner as in the second embodiment. More specifically, in the interference signal processing shown in FIG. 11, step S135 may not be executed, and step S140b may be executed instead of step S140.

D. Other Embodiments (D-1) In the embodiments, the sample signal Ts is a digital signal in the time domain. Alternatively, the sample signal Ts may be a digital signal in the time-frequency domain. In this case, the sample signal generator 105 can convert the beat signal Bw into a digital signal in the time-frequency domain by, for example, a short-term Fourier transform (STFT). In this case, for example, in step S105 of FIG. 3, the interference range determination unit 215 determines the interference range Ri as a time range for each frequency bins. In this case, the interference range Ri may be determined as a different time range for each frequency bins, or may be determined as the same time range. Further, in step S110, for example, the modified sample signal Ts2 is generated for each frequency bins by multiplying each frequency bins of the sample signal Ts in the time-frequency domain by the reduction signal Ti. Similarly, after step S115, the interference-removed signal Ts4 can be generated as a signal in the time-frequency domain by processing the modified sample signal Ts2 and the like for each frequency bins. The measurement processing unit 290 converts the interference-removed signal Ts4 generated as a signal in the time-frequency domain into a signal in the time domain by the inverse STFT, and appropriately processes and analyzes the signal in the time domain. Thus, the distance, angle, and speed relative to the object OB can be measured in the same manner as described in the first embodiment. Note that the sample signal generator 105 may generate the sample signal Ts, which is a digital signal in the time-frequency domain, using a transform method other than STFT, such as wavelet transform.

(D-2) In the embodiments, the evaluation value Vs is calculated as the sum of the absolute value of the first frequency domain sample signal Fs1 and the absolute value of the comparison signal Cs. However, the evaluation value Vs may not be calculated as the sum of the differences between the absolute value of the first frequency domain sample signal Fs1 and the absolute value of the comparison signal Cs. In this case, the evaluation value Vs may be calculated, for example, as the sum of the differences between the square of the absolute value of the first frequency domain sample signal Fs1 and the square of the absolute value of the comparison signal Cs.

(D-3) In the embodiments, the peak extraction unit 235 extracts at least one peak Ps included in the first frequency domain sample signal Fs1, and the evaluation value calculator 240 calculates the evaluation value Vs for determining whether the partial signal in the peak range is a true partial signal for each extracted peak Ps. However, the evaluation value Vs may not be calculated for each peak Ps. For example, the evaluation value Vs may be calculated for each frequency bins of the first frequency domain sample signal Fs1. In this case, the interference signal processing unit 210 may not have the peak extraction unit 235.

(D-4) In the embodiments, the selection unit 244 records the frequency position information PP of the selected partial signal. However, the selection unit 244 may not record the frequency position information PP of the selected partial signal.

(D-5) In the embodiments, the interpolator 270 generates the interference-removed signal Ts4 by interpolating the modified sample signal Ts2 based on the interpolated signal Ts3. However, the interference-removed signal Ts4 may not be generated by interpolating the modified sample signal Ts2 based on the interpolated signal Ts3. In this case, for example, the interference-removed signal Ts4 may be generated by inverse Fourier transforming the last generated updated signal Fs1R, among the updated signals Fs1R described in the first embodiment. In this case, the updated signal Fs1R may be subjected to the inverse Fourier transform after setting the signal intensity to 0 in the range other than the frequency position corresponding to the true partial signal, in the frequency range of the last-generated updated signal Fs1R.

(D-6) In the embodiments, Fourier transform is used as a method of transforming each signal from the time domain to the frequency domain, but other methods such as wavelet transform may be used. The same applies to the method of transforming from the frequency domain to the time domain.

E. The Others

The present disclosure should not be limited to the embodiments described above, and various other embodiments may be implemented without departing from the scope of the present disclosure. For example, in order to solve some or all of the above problems, or to achieve some or all of the above effects, the technical features in the embodiments can be replaced or combined as appropriate. Also, some of the technical features may be omitted as appropriate.

The control device and method described in the present disclosure may be implemented by a dedicated computer which is configured with a memory and a processor programmed to execute one or more particular functions embodied in computer programs of the memory. Alternatively, the control device described in the present disclosure and the method thereof may be realized by a dedicated computer configured as a processor with one or more dedicated hardware logic circuits. Alternatively, the control device and method described in the present disclosure may be realized by one or more dedicated computer, which is configured as a combination of a processor and a memory, which are programmed to perform one or more functions, and a processor which is configured with one or more hardware logic circuits. The computer program may be stored in a computer-readable non-transitory tangible storage medium, as an instruction to be executable by a computer.

According to a first aspect of the present disclosure, a radar device includes:
a transmitter configured to emit a transmission signal as an electromagnetic wave;
a receiver configured to receive, as a reception signal, a reflected wave representing the electromagnetic wave reflected by an object;
a beat signal generator configured to generate a beat signal based on the transmission signal and the reception signal;
a sample signal generator configured to generate a sample signal, which is a digital signal in a time domain or a time frequency domain, based on the beat signal; and
an interference signal processing unit configured to generate an interference-removed signal obtained by removing an interference component from the sample signal, wherein
the interference signal processing unit includes:
an interference range determination unit configured to determine an interference range representing a range in which the interference component is included in the sample signal;
a modified sample signal generator configured to generate a modified sample signal by multiplying the sample signal by a reduction signal for reducing a signal intensity in the interference range;
a sample signal conversion unit configured to convert the modified sample signal into a first frequency domain sample signal in a frequency domain;
a reduction signal conversion unit configured to convert the reduction signal into a subtraction template signal in a frequency domain; and
an evaluation value calculator configured to calculate an evaluation value based on the first frequency domain sample signal and the subtraction template signal so as to determine whether a partial signal representing at least a part of the first frequency domain sample signal is derived from the reflected wave, and
the interference signal processing unit generates the interference-removed signal such that a time domain signal based on the partial signal determined as derived from the reflected wave based on the evaluation value is included in a corresponding range corresponding to the interference range of the interference-removed signal.

According to a second aspect, the evaluation value calculator is configured to: generate a first subtraction signal by correcting a frequency position, an amplitude and a phase of the subtraction template signal based on a frequency position, an amplitude, and a phase of a target partial signal representing the partial signal to be determined based on the evaluation value, respectively, in a frequency range including at least a frequency with the largest amplitude in the subtraction template signal; generate a comparison signal by subtracting the first subtraction signal from the first frequency domain sample signal; and calculate the evaluation value for the target partial signal based on a difference between the first frequency domain sample signal and the comparison signal, in the first aspect.

According to a third aspect, the evaluation value calculator calculates the evaluation value for the target partial signal as a sum of differences between an absolute value of the first frequency domain sample signal and an absolute value of the comparison signal, in the second aspect.

According to a fourth aspect, the evaluation value calculator calculates the evaluation value based on a cross-correlation function between at least part of the first frequency domain sample signal and at least part of the subtraction template signal, in the first aspect.

According to a fifth aspect, the interference signal processing unit has a peak extraction unit configured to extract at least one peak included in the first frequency domain sample signal, and the evaluation value calculator calculates the evaluation value, for each peak, to determine whether the partial signal in a frequency range including a frequency position of the peak is derived from the reflected wave, based on the first frequency domain sample signal and the subtraction template signal, in any one of the first to fourth aspects.

According to a sixth aspect, the interference signal processing unit has a selection unit configured to select one or plural partial signals as the partial signal derived from the reflected wave based on the evaluation value, and to record information about a frequency position of a selected partial signal representing the partial signal selected by the selection unit; and the interference signal processing unit generates the interference-removed signal such that a time domain signal generated based on the frequency position of the selected partial signal is included in the corresponding range, in any one of the first to fifth aspects.

According to a seventh aspect, the interference signal processing unit has an interpolated signal generator configured to generate a time domain interpolated signal so as to interpolate a range corresponding to the interference range in the modified sample signal based on the frequency position of the selected partial signal, and the interference signal processing unit generates the interference-removed signal by interpolating the modified sample signal based on the interpolated signal, in the sixth aspect.

According to an eighth aspect, the interference signal processing unit further has an updating unit configured to update the first frequency domain sample signal, the updating unit generates a second subtraction signal by correcting a frequency position, an amplitude, and a phase of the subtraction template signal based on a frequency position, an amplitude, and a phase of the selected partial signal, respectively, in a frequency range including at least a frequency with the largest amplitude of the subtraction template signal, and the updating unit updates the first frequency domain sample signal by subtracting the second subtraction signal from the first frequency domain sample signal, in the sixth or seventh aspect.

According to a ninth aspect, a radar device includes: a transmitter configured to emit a transmission signal as an electromagnetic wave; a receiver configured to receive, as a reception signal, a reflected wave representing the electromagnetic wave reflected by an object; a beat signal generator configured to generate a beat signal based on the transmission signal and the reception signal; a sample signal generator configured to generate a sample signal, which is a digital signal in a time domain or a time frequency domain, based on the beat signal; and an interference signal processing unit configured to generate an interference-removed signal obtained by removing an interference component from the sample signal.

The interference signal processing unit includes a computer including a processor and a memory that stores instructions configured to, when executed by the processor, cause the processor to determine an interference range representing a range in which the interference component is included in the sample signal;

generate a modified sample signal by multiplying the sample signal by a reduction signal for reducing a signal intensity in the interference range;

convert the modified sample signal into a first frequency domain sample signal in a frequency domain;

convert the reduction signal into a subtraction template signal in a frequency domain; and calculate an evaluation value based on the first frequency domain sample signal and the subtraction template signal so as to determine whether a partial signal representing at least a part of the first frequency domain sample signal is derived from the reflected wave.

The interference signal processing unit generates the interference-removed signal such that a time domain signal based on the partial signal determined as derived from the reflected wave based on the evaluation value is included in a corresponding range corresponding to the interference range of the interference-removed signal.

What is claimed is:

1. A radar device comprising:
a transmitter configured to emit a transmission signal as an electromagnetic wave;
a receiver configured to receive, as a reception signal, a reflected wave representing the electromagnetic wave reflected by an object;
a beat signal generator configured to generate a beat signal based on the transmission signal and the reception signal;
a sample signal generator configured to generate a sample signal, which is a digital signal in a time domain or a time frequency domain, based on the beat signal; and
an interference signal processing unit configured to generate an interference-removed signal obtained by removing an interference component from the sample signal, wherein
the interference signal processing unit includes:
an interference range determination unit configured to determine an interference range representing a range in which the interference component is included in the sample signal;
a modified sample signal generator configured to generate a modified sample signal by multiplying the sample signal by a reduction signal for reducing a signal intensity in the interference range;
a sample signal conversion unit configured to convert the modified sample signal into a first frequency domain sample signal in a frequency domain;
a reduction signal conversion unit configured to convert the reduction signal into a subtraction template signal in a frequency domain; and
an evaluation value calculator configured to calculate an evaluation value based on the first frequency domain sample signal and the subtraction template signal so as to determine whether a partial signal representing at least a part of the first frequency domain sample signal is derived from the reflected wave, and
the interference signal processing unit generates the interference-removed signal such that a time domain signal based on the partial signal determined as derived from the reflected wave based on the evaluation value is included in a corresponding range corresponding to the interference range of the interference-removed signal.

2. The radar device according to claim 1, wherein the evaluation value calculator is configured to generate a first subtraction signal by correcting a frequency position, an amplitude and a phase of the subtraction template signal based on a frequency position, an amplitude, and a phase of a target partial signal representing the partial signal to be determined based on the evaluation value, respectively, in a frequency range including at least a frequency with the largest amplitude in the subtraction template signal;

generate a comparison signal by subtracting the first subtraction signal from the first frequency domain sample signal; and calculate the evaluation value for the target partial signal based on a difference between the first frequency domain sample signal and the comparison signal.

3. The radar device according to claim 2, wherein
the evaluation value calculator calculates the evaluation value for the target partial signal as a sum of differences between an absolute value of the first frequency domain sample signal and an absolute value of the comparison signal.

4. The radar device according to claim 1, wherein
the evaluation value calculator calculates the evaluation value based on a cross-correlation function between at least part of the first frequency domain sample signal and at least part of the subtraction template signal.

5. The radar device according to claim 1, wherein
the interference signal processing unit has a peak extraction unit configured to extract at least one peak included in the first frequency domain sample signal, and the evaluation value calculator calculates the evaluation value, for each peak, to determine whether the partial signal in a frequency range including a frequency position of the peak is derived from the reflected wave, based on the first frequency domain sample signal and the subtraction template signal.

6. The radar device according to claim 1, wherein
the interference signal processing unit has a selection unit configured to select one or plural partial signals as the partial signal derived from the reflected wave based on the evaluation value, and to record information about a frequency position of a selected partial signal representing the partial signal selected by the selection unit; and the interference signal processing unit generates the interference-removed signal such that a time domain signal generated based on the frequency position of the selected partial signal is included in the corresponding range.

7. The radar device according to claim 6, wherein
the interference signal processing unit has an interpolated signal generator configured to generate a time domain interpolated signal so as to interpolate a range corresponding to the interference range in the modified sample signal based on the frequency position of the selected partial signal, and the interference signal processing unit generates the interference-removed signal by interpolating the modified sample signal based on the interpolated signal.

8. The radar device according to claim 6, wherein
the interference signal processing unit further has an updating unit configured to update the first frequency domain sample signal, the updating unit generates a second subtraction signal by correcting a frequency position, an amplitude, and a phase of the subtraction template signal based on a frequency position, an amplitude, and a phase of the selected partial signal, respectively, in a frequency range including at least a frequency with the largest amplitude of the subtraction template signal, and the updating unit updates the first frequency domain sample signal by subtracting the second subtraction signal from the first frequency domain sample signal.

9. A radar device comprising:
a transmitter configured to emit a transmission signal as an electromagnetic wave;
a receiver configured to receive, as a reception signal, a reflected wave representing the electromagnetic wave reflected by an object;
a beat signal generator configured to generate a beat signal based on the transmission signal and the reception signal;
a sample signal generator configured to generate a sample signal, which is a digital signal in a time domain or a time frequency domain, based on the beat signal; and
an interference signal processing unit configured to generate an interference-removed signal obtained by removing an interference component from the sample signal, wherein
the interference signal processing unit includes a computer including a processor and a memory that stores instructions configured to, when executed by the processor, cause the processor to
determine an interference range representing a range in which the interference component is included in the sample signal;
generate a modified sample signal by multiplying the sample signal by a reduction signal for reducing a signal intensity in the interference range;
convert the modified sample signal into a first frequency domain sample signal in a frequency domain;
convert the reduction signal into a subtraction template signal in a frequency domain; and
calculate an evaluation value based on the first frequency domain sample signal and the subtraction template signal so as to determine whether a partial signal representing at least a part of the first frequency domain sample signal is derived from the reflected wave, and
the interference signal processing unit generates the interference-removed signal such that a time domain signal based on the partial signal determined as derived from the reflected wave based on the evaluation value is included in a corresponding range corresponding to the interference range of the interference-removed signal.

* * * * *